Dec. 18, 1934.  S. C. HOARE  1,985,095
DIFFERENTIAL ELECTRICAL MEASURING APPLIANCE
Filed Oct. 27, 1933
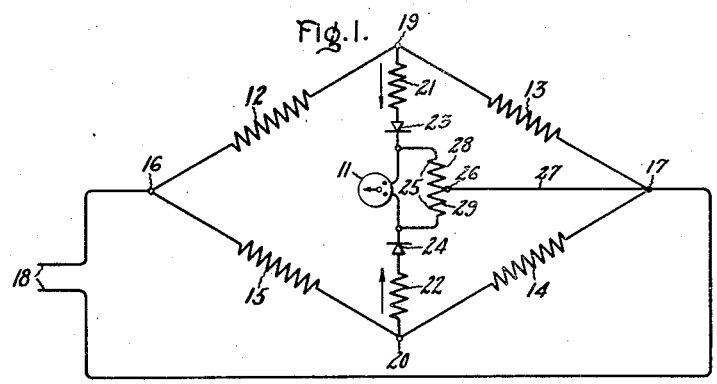
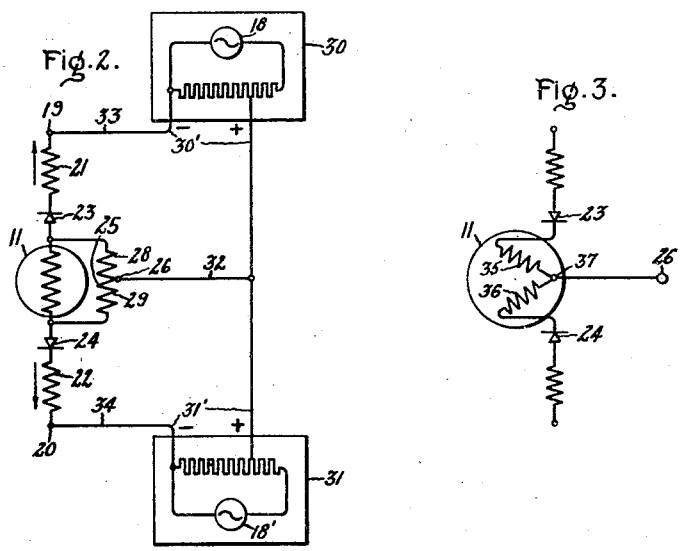
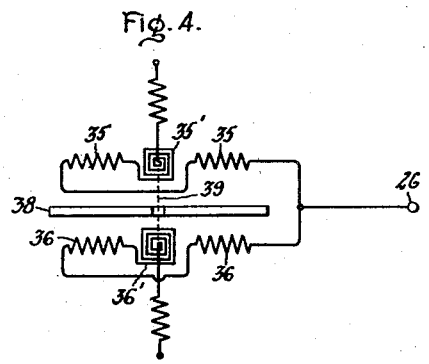
Inventor:
Stephen C. Hoare.
by Harry E. Dunham
His Attorney.

Patented Dec. 18, 1934

1,985,095

UNITED STATES PATENT OFFICE 1,985,095

DIFFERENTIAL ELECTRICAL MEASURING APPLIANCE

Stephen C. Hoare, Manchester, Mass., assignor to General Electric Company, a corporation of New York Application October 27, 1933, Serial No. 695,469

6 Claims. (Cl. 171—95)

My invention relates to electrical measuring devices and concerns particularly devices of the differential type.

Certain types of electrical measurements are conveniently made by setting up balanced circuits or by comparing the degree of unbalance between two related circuits. A well known type of balanced circuit for measuring resistances or impedances, for example, is the Wheatstone bridge. My invention is applicable to circuits of the Wheatstone bridge type and also to apparatus in general utilizing balanced or opposing circuits. In connection with direct-current measurements, directional current detecting devices, such as d'Arsonval galvanometers, may be employed to cause deflections in opposite directions as the circuit characteristics are varied from one side of balance to another. In connection with measurements in accordance with the null or zero deflection method, it is advantageous to know in which direction the circuit characteristics should be varied in order to obtain the balance which results in the zero deflection.

Although measurements involving alternating currents may also be made by utilizing balanced circuits, a difficulty arises in connection with such measurements that an alternating-current detector necessarily is not directional and is not capable of indicating on which side of balance the circuit conditions lie. Furthermore, owing to differences in phase relationship, it may be impossible to obtain a zero indication from an alternating-current detector even when the circuits are in balance. Another difficulty which arises in connection with alternating-current measurements of high precision is the fact that alternating-current instruments and detecting devices are inherently less sensitive than instruments available for use with direct current. This latter difficulty may be overcome, to a large degree at least, by employing direct-current instruments in connection with rectifiers. In this case again, however, since the current is permitted to flow through the instrument in only one direction, it is not possible to obtain indications as to which side of balance the circuit conditions lie.

It is an object of my invention to provide a measuring system and current-responsive apparatus which may be employed with either alternating or direct-current circuits to produce indications not merely of the presence and magnitude of electrical currents, but also indications of the direction in which electrical circuits are unbalanced. It is a further object of my invention to provide an arrangement permitting the use of direct-current instruments for making measurements involving alternating currents. It is still another object of my invention to provide an arrangement for comparing alternating currents or voltages which will indicate not merely the magnitude of their difference, but also which is greater. Other and further objects and advantages will become apparent as the description proceeds.

In accordance with my invention in its preferred form, a direct-current responsive device is connected through half wave rectifiers to electrical circuits in which the current or voltage is to be compared. The rectifiers are connected on either side of the current-responsive device and are arranged for current passage in opposite directions. A common or neutral conductor from the opposing circuits is connected to a neutral terminal which may be obtained by utilizing a double winding instrument and connecting to the common point of the two windings. A neutral terminal may also be obtained by connecting to the midpoint of an impedance connected in shunt with a single winding instrument. With this arrangement, the instrument or current-responsive device obviously responds to either alternating or direct currents and also indicates which of two opposing circuits is carrying the greater current.

The features of my invention which I believe to be novel and patentable will be pointed out in claims appended hereto. My invention, itself, however, will be best understood by referring to the following description taken in connection with the accompanying drawing in which Fig. 1 is a schematic circuit diagram representing one embodiment of my invention; Fig. 2 is a circuit diagram representing another embodiment of my invention; and Figs. 3 and 4 are circuit diagrams of modified forms of my invention.

Referring now more in detail to the drawing in which like reference characters designate like parts throughout, I have shown direct-current electrical instruments 11 in connection with various types of electrical circuits. In the arrangement of Fig. 1, a circuit similar to the Wheatstone bridge is employed. It consists of four impedances, 12, 13, 14, and 15, connected as a quadrilateral or Wheatstone bridge. The pair of impedances 12 and 13 are in parallel with the pair of impedances 14 and 15, and have their common terminals 16 and 17 connected to a suitable source of current 18.

If the bridge is to be used for measuring the magnitude of one of the impedances, for example, the impedance 12, the impedances of the remaining elements 13, 14, and 15 will be so adjusted that the voltage drops will be in the same ratio in impedances 12 and 13 as in the impedances 14 and 15 and, consequently, no current will flow in the current-responsive device 11 as will be explained hereinafter. Ordinarily, such a measurement is made by employing fixed impedances in two arms of the circuit, for example, at 13 and 14, and substituting various values of impedance in the remaining arm, for example, the arm 15, until a balance is obtained. As will be readily understood by those skilled in the art, the impedance of the unknown arm 12 may then be determined by calculation from the impedances of the remaining arms 13, 14, and 15.

When such a measurement is made of simple resistances and a direct-current source is used, a direct-current instrument, such as a d'Arsonval galvanometer, is employed as the current-responsive device 11. In such a case, points 19 and 20 will obviously be at the same potential when the circuits are in balance and the voltage drops in resistances 13 and 14 are equal. A d'Arsonval instrument connected directly between points 19 and 20 would then give a zero reading. If the circuits are out of balance, the instrument will deflect in one direction or another, depending upon the direction of the current through it, which in turn depends upon which resistance, 13 or 14, has the greater voltage drop in it, or similarly which resistance 15, or 12, has the greater voltage drop in it. An indication is thus provided of whether the resistance of the arm 15 must be increased or decreased to obtain a balance. This measuring arrangement may also be employed for measuring alternating-current resistance and for measuring capacitive and inductive impedances by employing an alternating-current source connected at 18. In order to obtain the advantages of the high sensitivity of the d'Arsonval instrument, rectifiers may be employed.

However, a greater difficulty is experienced in balancing alternating-current circuits owing to the possibility of having either inductive or capacitative reactances in addition to resistances in any of the arms of the bridge. If the phase angles of the impedances are not the same or symmetrical, a potential difference will exist between points 19 and 20 even when the circuits are balanced to the extent of having the same ratio of voltage drops in branches 12—13, and 15—14. This would be due to a difference in phase between points 19 and 20. Such a balance of out-of-phase voltages would be indicated by a minimum rather than a zero reading of the usual alternating-current galvanometer connected between 19 and 20. A minimum reading is obviously not as definite as a zero reading. It is desirable, therefore, to employ an arrangement in which the detector 11 will indicate definitely when the circuits are in balance regardless of phase relationships.

In the arrangement of Fig. 1, the current-responsive device 11 is connected between balance points 19 and 20 of the bridge in series with current limiting impedances 21, 22, and rectifiers 23 and 24. The rectifiers 23 and 24 are preferably of the half wave type and may be of any desired form, such as, for example, copper oxide rectifiers. The rectifiers 23 and 24 are so arranged that one tends to permit current to flow in only one direction and the other tends to permit current to flow in only the other direction with respect to the balance points 19 and 20. For example, in the arrangement of Fig. 1, the rectifiers 23 and 24 are so arranged that currents tend to flow only toward the current-responsive device 11. However, it will be understood that rectifiers 23 and 24 may also be arranged so that current tends to flow only toward the balance points 19 and 20 as indicated in Fig. 2. In order that the direction of deflection of the current-responsive device 11 will indicate in which arm 13 or 14 there is the greater voltage drop, a common terminal of the parallel circuits, such as the terminal 17, is connected to a neutral point with respect to the ends of the winding of the current-responsive device 11. This may be done by connecting an impedance 25 in shunt with the current-responsive device 11 and joining the point 17 with a point 26, preferably the midpoint of the impedance 25.

In the operation of the apparatus shown in Fig. 1, current will tend to flow in both branches 12—13, and 15—14 of the circuit. If the values of the impedances of arms 12, 13, 14, and 15 are such that the circuit is unbalanced, that is, are such that the same fraction of the voltage drop does not occur in the impedances 12 and 15, or in the impedances 14 and 13, unequal currents will flow in the impedances 21 and 22. Owing to the presence of the rectifiers 23 and 24, current cannot flow directly between points 19 and 20, as in the case of a simple direct-current Wheatstone bridge. However, current will tend to flow through both impedances 21 and 22 toward the current-responsive device 11. It will be understood that in the case of direct-current measurements, the polarity of the source 18 will be made such that the point 17 is positive and the point 16 is negative. Current flowing through impedance 21 will flow through the rectifier 23 and then divide, part flowing through the upper portion 28 of the impedance 25 and the other part flowing through the current-responsive device 11 and the lower portion 29 of the impedance 25 to the midpoint 26. Current flowing through the impedance 22 will divide in a similar manner between the current-responsive device 11 and the lower portion 29 of the impedance 25, flowing, however, in the opposite direction through the current-responsive device 11.

The deflection of the current-responsive device 11 will be dependent upon the algebraic sum of the two currents flowing through the impedances 21 and 22. If the value of one of the impedances of the bridge is then varied so as to throw the circuit into unbalance in the opposite direction, current in the current-responsive device 11 will be in the opposite direction and a deflection in the opposite direction will be produced, thereby indicating that the point of balance has been passed in changing the impedances of the bridge. Obviously measurements may be made either by adjusting the impedances until a balance is obtained or by retaining a fixed adjustment and calibrating the instrument 11 in terms of the quantity to be measured. It will be apparent that the response of the device 11 depends upon the difference in absolute values of the voltages in arms 13 and 14 and is independent of their phase relationship.

Although I have described my invention in connection with bridge circuits, it will be understood that my invention is not limited to this precise arrangement. My differential measuring system may be employed for comparing the currents or voltages in any two electrical circuits.

For example, in the arrangement of Fig. 2, the schematically represented electrical devices 30 and 31 having output terminals 30' and 31', and being energized by current sources 18 and 18' respectively, are connected by means of a common conductor 32 to the neutral point 26 of the measuring apparatus. The device 30 is connected to the terminal 19 through conductor 33, and the device 31 is connected to the terminal 20 through a conductor 34. When the output voltages or currents of devices 30 and 31 are equal, the currents in portions 28 and 29 of impedance 25 will be equal and no current will flow in current-responsive device 11, resulting in lack of response or a zero deflection thereof. This will be the case where alternating currents are involved, whether or not the voltages or currents of devices 30 and 31 are in phase. If devices 30 and 31 are energized by direct current, care will obviously be taken to connect them with the proper polarities with respect to the measuring apparatus.

The arrangements of Figs. 1 and 2 permit the use of simple single winding direct-current instruments. However, if desired, double winding instruments may also be employed as shown in Fig. 3. In the arrangement of Fig. 3, the winding of the current-responsive device 11 is divided into two portions 35 and 36 with a common terminal 37 brought out as the neutral terminal 26 corresponding to the midpoint 26 of the impedance 25 in Figs. 1 and 2. Currents flowing in opposite directions in portions 35 and 36 will obviously act in opposition, so that a null deflection is obtained when the currents are equal.

Although I prefer, for the sake of greater sensitivity, to employ a direct-current instrument such as a d'Arsonval instrument and rectifiers, it will be understood that the form of my invention shown in Fig. 3 may, if desired, be modified by utilizing a double element alternating-current responsive device at 11 and omitting the rectifiers 23 and 24. Such a current-responsive device might, if desired, take the form of a double electrodynamometer having stationary windings 35 and 36 and movable windings 35' and 36', with the windings so connected that the torque produced by windings 35 and 35' would oppose that produced by windings 36 and 36'. The windings 35 and 35' would be magnetically shielded from windings 36 and 36' by a high permeability sheet 38 and the opposing elements would be connected mechanically by a shaft 39 in preference to electrically as in Fig. 3 in cases where it was desired to eliminate the effect of phase differences in this form of my invention.

In accordance with the provisions of the patent statutes, I have described the principle of operation of my invention, together with the apparatus which I now consider to represent the best embodiments thereof; but I desire to have it understood that the apparatus shown is only illustrative and that the invention may be carried out by other means.

What I claim as new and desire to secure by Letters Patent of the United States is:

1. An electrical circuit comprising two pairs of impedances connected in series-parallel to form a bridge, a source of current connected to one pair of opposite points of said bridge, a direct-current responsive device and a pair of half wave rectifiers connected in series between the other pair of opposite points of said bridge and an impedance connected in parallel with said direct-current responsive device, said latter impedance having an intermediate point connected to one side of said current source, said rectifiers being in series with said direct-current responsive device on either side thereof and being arranged for current passage in opposite directions with respect to said current-responsive device.

2. In a bridge circuit having a pair of opposite terminals for connection to a current source and a second pair of opposite terminals for connection to a current-responsive device, differential indicating means comprising a direct-current responsive device, a pair of half wave rectifiers arranged for current passage in opposite directions, connected on either side thereof in series therewith between the second-mentioned pair of terminals of said bridge circuit, and an impedance connected in parallel with said direct-current responsive device and having an intermediate point thereof connected to one of the current supply terminals of said bridge circuit.

3. An electrical measuring apparatus comprising a direct-current responsive device having a pair of main terminals and a pair of rectifiers each having a pair of terminals, one of the terminals of each of said rectifiers being connected to one of said terminals of said current-responsive device, the rectifiers being arranged for current passage in opposite directions, said current-responsive device having a terminal intermediate to said main terminals serving as a neutral terminal for said apparatus, the remaining terminals of said rectifiers serving as the main terminals of said apparatus.

4. An electrical apparatus for determining balance in parallel electrical circuits having a common terminal and independent terminals which comprises a direct-current responsive electrical device having a pair of terminals, a pair of half wave rectifiers, one of which is connected between one of the terminals of said current-responsive device and the independent terminal of one of said circuits, the other of which is connected between the remaining terminal of said current-responsive device and the independent terminal in the other of said circuits, and an impedance connected in parallel with said current-responsive device having an intermediate point connected to the common terminal of said circuits.

5. An electrical measuring apparatus comprising a current-responsive device having opposing elements with a common connection, and with independent connections, a pair of rectifiers connected on either side of said device through said independent connections, and arranged for current passage in opposite directions, the common point of said opposing elements serving as a neutral connection for said apparatus, and the free sides of said rectifiers being separate and serving as main connections for said apparatus.

6. In a Wheatstone bridge circuit having a pair of opposite terminals for connection to a current supply and a second pair of opposite terminals for connection to a current-responsive device, a differential indicating device comprising a current-responsive device having a pair of main terminals connected in series with said second-mentioned pair of bridge terminals and having a neutral terminal connected to one of said supply terminals, whereby said current-responsive device is caused to respond oppositely to currents flowing thereto from said second-mentioned pair of bridge terminals.

STEPHEN C. HOARE.